United States Patent
Yang

(10) Patent No.: US 6,237,983 B1
(45) Date of Patent: May 29, 2001

(54) ROLLER SUNSHADE FOR MOUNTING ON CAR ROOF

(75) Inventor: Ming-Shun Yang, Taipei (TW)

(73) Assignee: Formosa Saint Jose Corp., Taipei (TW)

( * ) Notice: Subject to any disclaimer, the term of this patent is extended or adjusted under 35 U.S.C. 154(b) by 0 days.

(21) Appl. No.: 09/523,944

(22) Filed: Mar. 13, 2000

(51) Int. Cl.⁷ .............................. E04H 15/08; B60R 9/058
(52) U.S. Cl. ................. 296/95.1; 135/88.1; 160/370.22; 224/309; 224/559
(58) Field of Search .................... 296/95.1, 163; 248/205.8, 205.9, 206.1, 206.2, 309.3; 224/309, 314, 322, 559; 160/24, 370.22, DIG. 13; 135/88.07, 88.1, 88.11, 88.12, 88.16

(56) References Cited

U.S. PATENT DOCUMENTS

| | | | |
|---|---|---|---|
| 2,594,065 | * | 4/1952 | O'Neill ................................. 135/160 |
| 2,621,836 | * | 12/1952 | McMiller ............................. 224/328 |
| 3,152,832 | * | 10/1964 | Kamp ................................. 296/95.1 |
| 3,304,996 | * | 2/1967 | Francis ................................. 160/369 |
| 3,375,036 | * | 3/1968 | Francis ................................. 296/95.1 |
| 3,957,301 | * | 5/1976 | Huber ................................. 296/95.1 |
| 4,929,016 | * | 5/1990 | Kastanis ............................. 296/136 |
| 5,558,145 | * | 9/1996 | Baka ................................. 160/67 |
| 5,700,048 | * | 12/1997 | Wade et al. ............................. 296/163 |
| 6,059,010 | * | 5/2000 | Yang ................................. 160/370.22 |
| 6,142,432 | * | 11/2000 | Amussen ............................. 248/205.5 |

* cited by examiner

*Primary Examiner*—D. Glenn Dayoan
*Assistant Examiner*—Paul Chenevert
(74) *Attorney, Agent, or Firm*—Erik M Arnhem

(57) ABSTRACT

A roller sunshade for mounting on a car roof mainly includes an automatic sunshade winding mechanism and a plurality of adjustable sucker sets. Each of the two adjustable sucker sets includes two adhering sucker mechanisms and a long metal member. The adhering sucker mechanism each includes from bottom to top a sucker main body, a supporting board that is rotatable by up to 360 degrees relative to the sucker main body, a locating block, a buffer washer, a ring member, and a bolt. These two adjustable sucker sets are symmetrically attached by vacuum suction to predetermined positions at two sides of the car roof. Thereafter, the automatic sunshade winding mechanism is connected to tops of the two adjustable sucker sets to provide a shady place for use outdoors.

9 Claims, 5 Drawing Sheets

ROLLER SUNSHADE FOR MOUNTING ON CAR ROOF

BACKGROUND OF THE INVENTION

The present invention relates to a roller sunshade for mounting on a car roof, and more particularly to a roller sunshade that can be easily mounted on any place on a car roof as needed to provide a shady place during outdoor activities.

Camping, fishing, and travelling have become the most favorite and popular recreational activities among most people in holidays in order to release them from busy work and tense life. In such outdoor activities, it is not always easy for people to find a shady place to escape from the strong sunrays. And, it is very uncomfortable and even harmful to be exposed to the strong sunrays for a prolonged time. A car equipped with means to provide a shady place would conveniently overcome the difficulty in finding a shady place in outdoors.

There are various types of sunshades for using outdoors. However, such conventional sunshades usually require different tools and a lot of fastening means, such as screws, to lock their four fixing means to two sides of the car roof, (that is, the dripping moldings). Thereafter, the bulky and heavy sunshade is screwed to the fixing means. The above procedure for connecting the conventional sunshade to a car roof in an attempt to provide a shady place is obviously time and labor consuming. And, once the sunshade is fixed to the car roof, it can not be easily dismounted from the car roof. To save troubles, the sunshade is frequently left on the car roof even when the car is not used for outdoor recreational activities. The sunshade that is always carried on the car roof would make the car look strange and is subject to shortened usable life due to frequent exposure to the sunshine and rainwater.

Another problem with the conventional sunshade for mounting on a car roof is the sunshade usually has fixed height relative to the roof, and such fixed height would usually conflict with any lamp, antenna seat or luggage rack fixedly mounted on the roof and cause troubles in mounting the sunshade on the roof.

It is therefore tried by the inventor to develop an improved roller sunshade for mounting on a car roof to eliminate the drawbacks existing in the conventional sunshades.

SUMMARY OF THE INVENTION

A roller sunshade for mounting on a car roof mainly includes an automatic sunshade winding mechanism and a plurality of adjustable sucker sets. Each of the two adjustable sucker sets includes two adhering sucker mechanisms and a long metal member. The adhering sucker mechanism each includes from bottom to top a sucker main body, a supporting board that is rotatable by up to 360 degrees relative to the sucker main body, a locating block, a buffer washer, a ring member, and a bolt. These two adjustable sucker sets are symmetrically attached by vacuum suction to predetermined positions at two sides of the car roof. Thereafter, the automatic sunshade winding mechanism is connected to tops of the two adjustable sucker sets to provide a shady place for use outdoors.

DETAILED DESCRIPTION OF THE PREFERRED EMBODIMENTS

Figure 1:
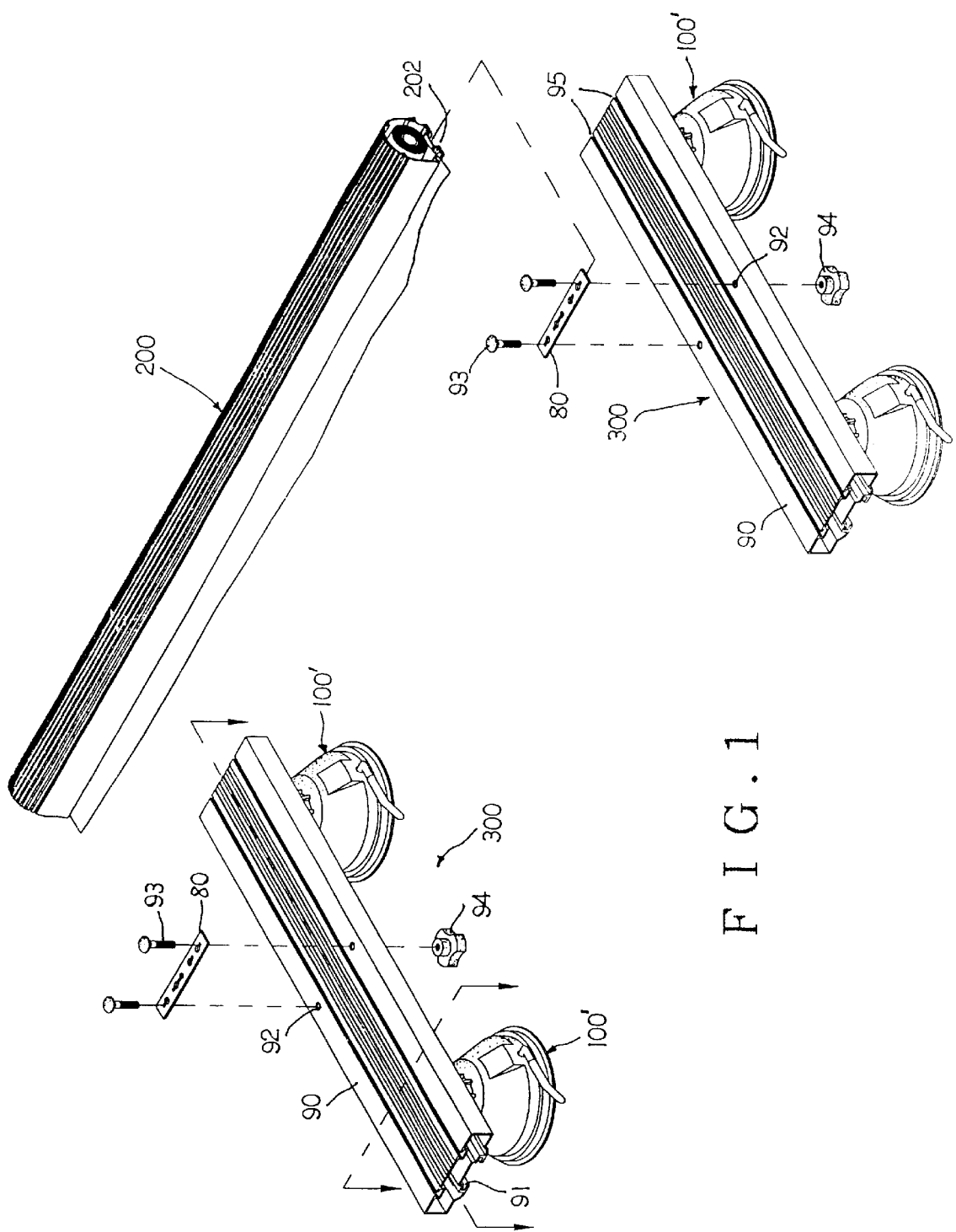
FIG. 1 illustrates an example of mounting an automatic sunshade winding mechanism (200) onto two adjustable sucker mechanisms (300) according to the present invention.
Figure 2:
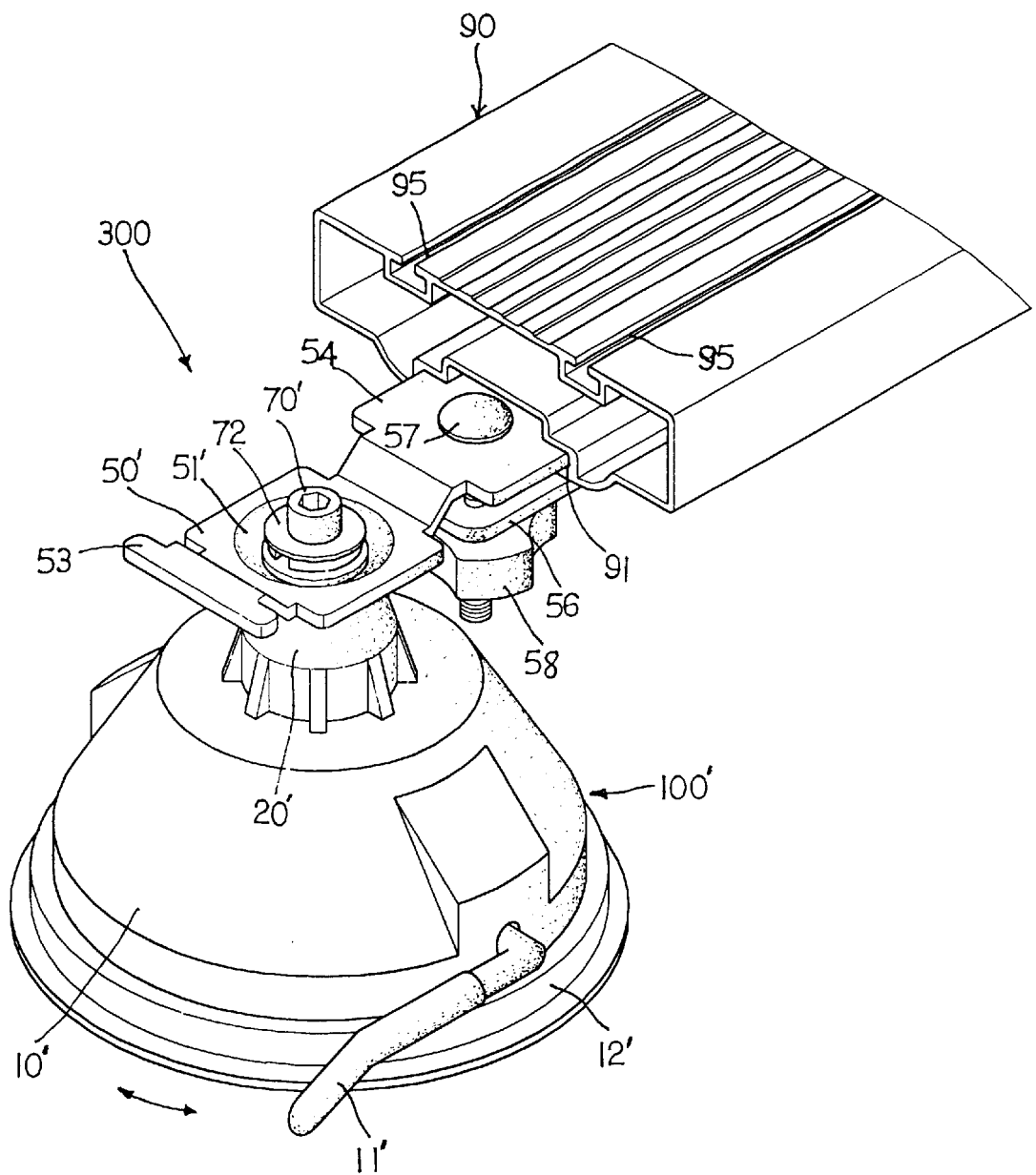
FIG. 2 is a perspective of the adjustable sucker mechanism (300) according to the present invention.
Figure 3:
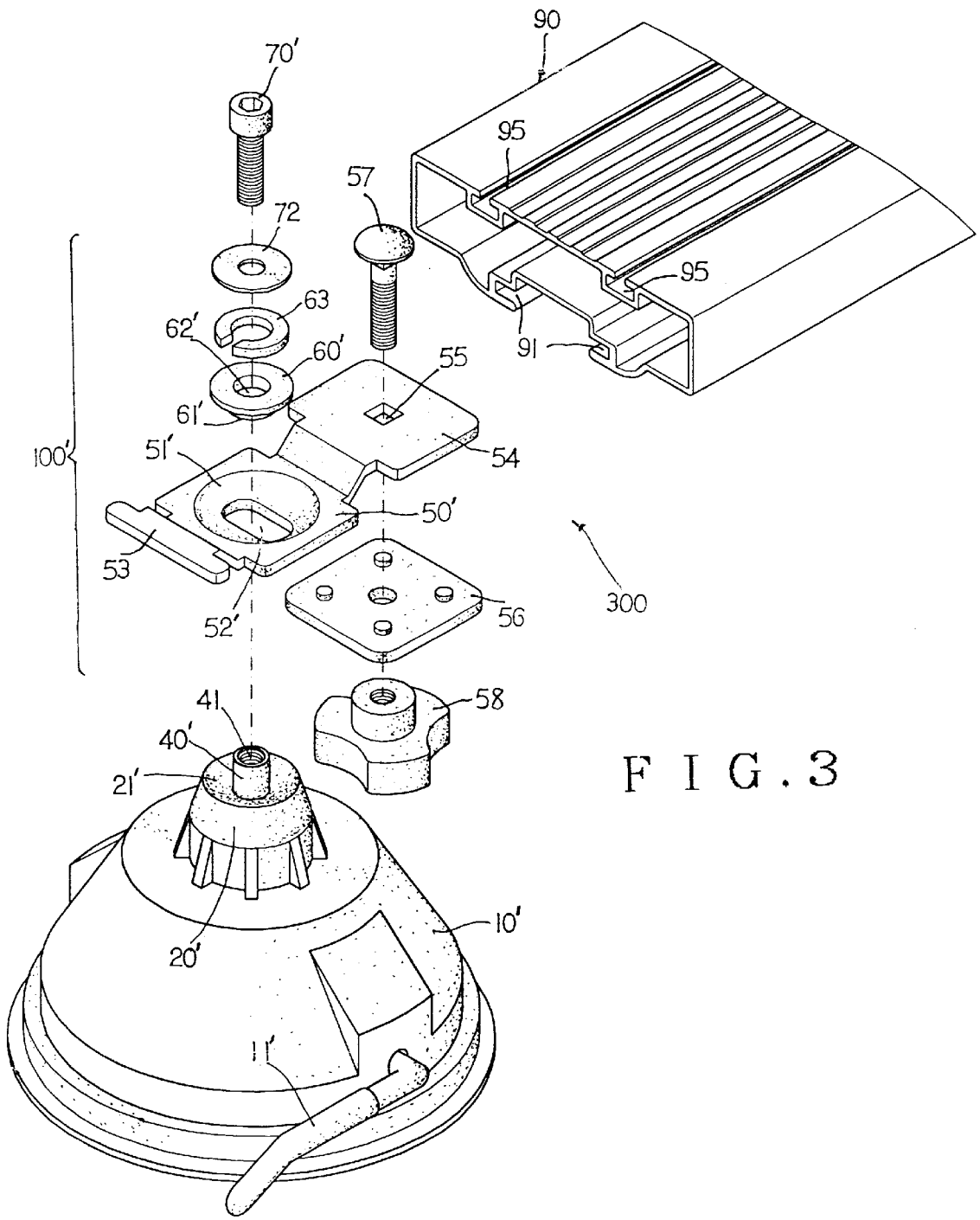
FIG. 3 is an exploded perspective of the adjustable sucker mechanism (300) of FIG. 2.

Please refer to FIGS. 1, 2 and 3 in which a roller sunshade for mounting on a car roof according to the present invention is shown. In this embodiment, the roller sunshade mainly includes an automatic sunshade winding mechanism (200) and a plurality of adjustable sucker sets (300). For clarity purpose, there are only two adjustable sucker sets (300) illustrated in the drawings. These two adjustable sucker sets (300) are symmetrically attached by vacuum suction to predetermined positions at two sides of the car roof. Thereafter, the automatic sunshade winding mechanism (200) is connected to tops of the two adjustable sucker sets (300) to provide a shady place for use outdoors.

Each of the two adjustable sucker sets (300) shown in FIGS. 1, 2 and 3 includes two adhering sucker mechanisms (100') and a long metal member (90). The adhering sucker mechanism (100') each includes from bottom to top a sucker main body (10'), a supporting board (50') that is rotatable by up to 360 degrees relative to the sucker main body (10'), a locating block (60'), a buffer washer (63), a ring member (72), and a bolt (70').

The sucker main body (10') has a handling bar (11') provided at an outer side thereof. By operating the handling bar (11'), a rubber concave disc portion (12') provided at a bottom of the sucker main body (10') is caused to firmly and tightly adhere to the car roof by vacuum suction.

As shown in the drawings, the sucker main body (10') is provided at a top center with an integrally molded seat (20'). The seat (20') has a concave top surface to provide a shallow round recess (21').

Figure 4:
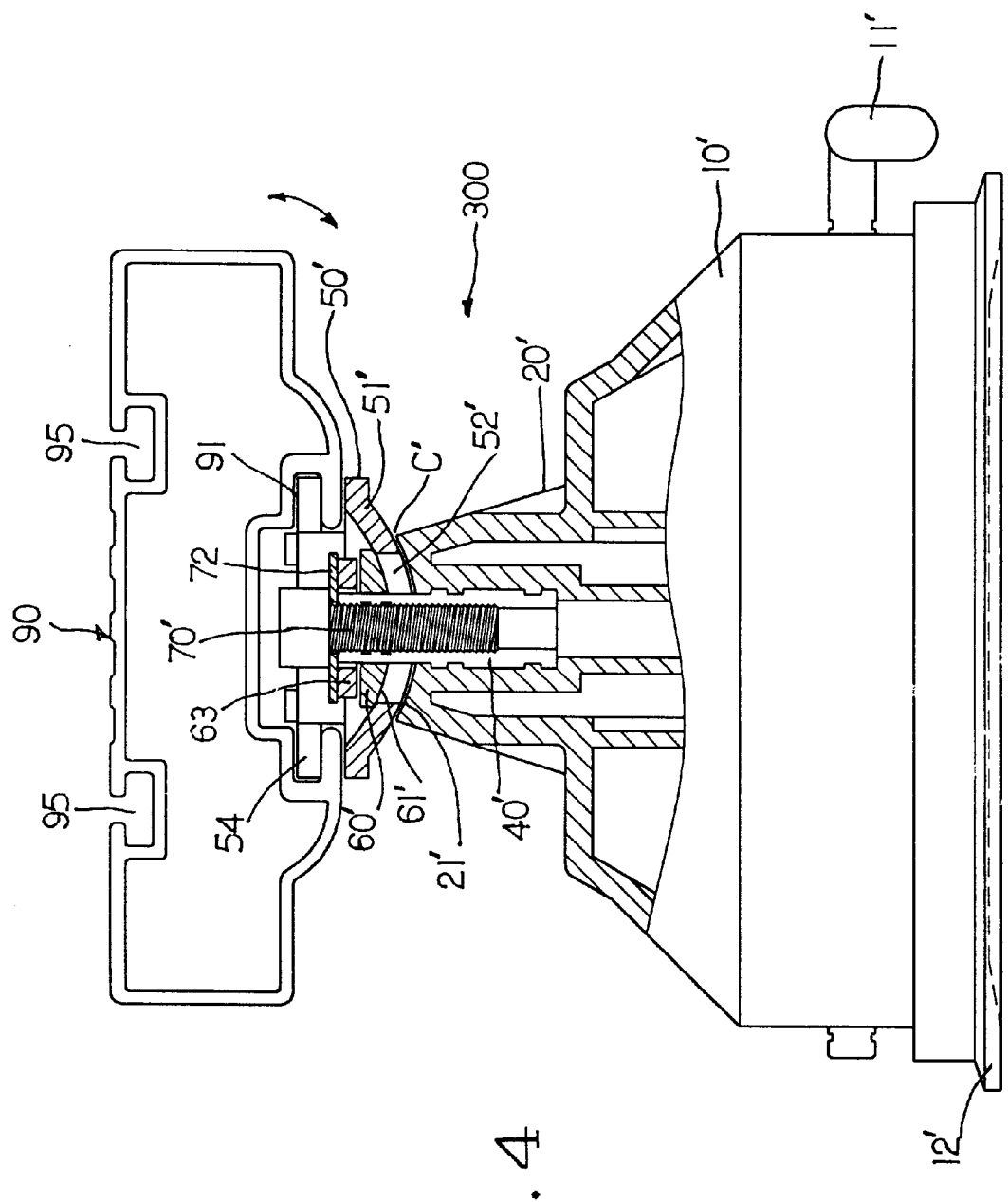
FIG. 4 is a partially sectional side view of the adjustable sucker mechanism (300) of FIG. 2.

Please refer to FIGS. 3 and 4. A sleeve (40') is fixedly provided to upward project from a central area of the seat (20') at the top of the sucker main body (10'). The sleeve (40') is provided with an internal thread (41) for the bolt (70') to thread thereinto. The sleeve (40') sequentially upward extends through a long slot (52') provided at a central portion of the 360-degree rotatable supporting board (50'), a vertical central hole (62') provided at a center of the locating block (60'), and the buffer washer (63), so that an upper end of the sleeve (40') presses against a bottom surface of the ring member (72).

Figure 5:
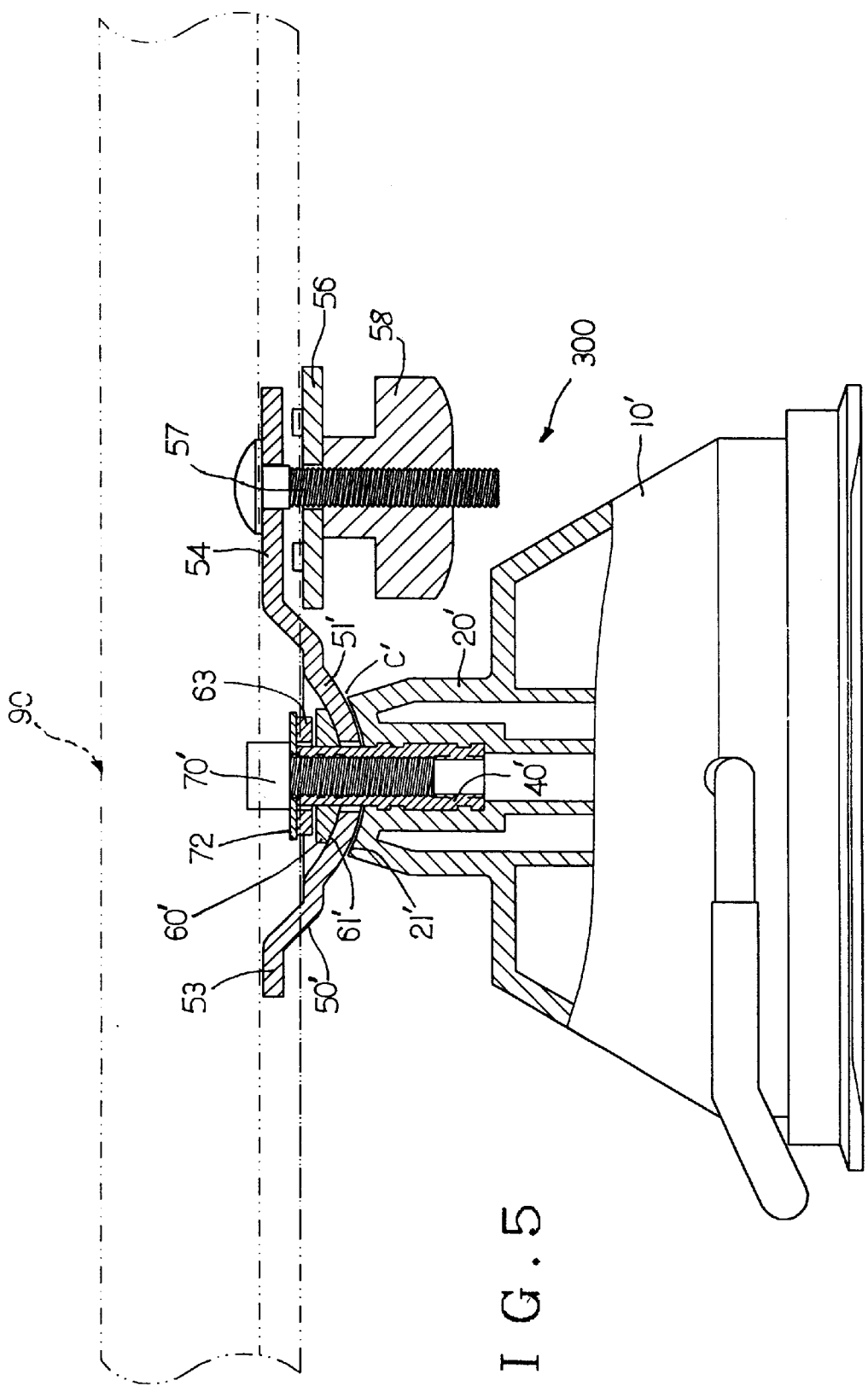
FIG. 5 is another partially sectional side view of the adjustable sucker mechanism (300) of FIG. 2.

Please refer to FIGS. 3, 4 and 5. The 360-degree rotatable supporting board (50') has a round and concave central area (51') formed at its top surface. The concave central area (51') protrudes downward from the supporting board (50') and has a bottom contour corresponding to the shallow round recess (21') at the top of the seat (20'), so that the concave central area (51') is allowed to freely and slidably rotate within the shallow round recess (21') by up to 360 degrees in any direction. That is, the supporting board (50') is angularly adjustable in its horizontal position relative to the sucker main body (10'). The long slot (52') provided at the central portion of the supporting board (50') is located in the concave central area (51') for the sleeve (40') to extend there through, so that the supporting board (50') is allowed to shift in an axial direction of the long slot (52') relative to the sleeve (40').

The locating block (60') has a round conical bottom (61') that has a contour matching with that of the concave central area (51') of the supporting board (50'). Therefore, the locating block (60') could be positioned in the concave central area (51'). The locating block (60') has a vertical central hole (62') for the sleeve (40') on the seat (20') to extend therethrough.

Please refer to FIGS. 3, 4 and 5. The sleeve (40') on the top of the seat (20') of the sucker main body (10') has an overall length projected from the shallow round recess (21') larger than a total thickness of the supporting board (50'), the central hole (62') of the locating block (60') and the buffer washer (63). Therefore, when the sleeve (40') is upward extended through the long slot (52') of the supporting board (50'), the central hole (62') of the locating block (60'), and the buffer washer (63), the upper end of the sleeve (40') would abut against the bottom surface of the ring member (72). This design allows a clearance (C') to always exist between the concave central area (51') of the supporting board (50') and the shallow round recess (21') of the seat (20'). With the existence of the clearance (C'), the concave central area (51') is allowed to freely slidably rotate in the shallow round recess (21') by up to 360 degrees. Whereby, when the adhering sucker mechanism (100') is adhered by vacuum suction to the roof of a car that may be of any different version, the supporting board (50') of the adhering sucker mechanism (100') may be adjusted to a position and a suitable angle of inclination relative to the car roof.

The 360-degree rotatable supporting board (50') shown in FIGS. 2 and 3 includes outward extended left and right wings (53) and (54), respectively. The right wing (54) has a square central hole (55). A lower clamping plate (56) having a central through hole is provided below the right wing (54). To connect the adhering sucker mechanism (100') to the long metal member (90), first align the right wing (54) with two lower rails (91) formed at a bottom of the long metal member (90) and push a part of the wing (54) into the long metal member (90) along the lower rails (91). Then, attach the lower clamping plate (56) to the bottom of the long metal member (90) below the right wing (54) and use a bolt (57) and a nut (58) to clamp the bottom of the long metal member (90) between the right wing (54) and the lower clamping plate (56), making the adhering sucker mechanism (100') and the long metal member (90) a unitary body.

As shown in FIGS. 1, 2 and 3, the two wings (53), (54) of the supporting board (50') may be fully pushed into the lower rails (91) below the long metal member (90). The long metal member (90) each is provided at a central portion near two outer sides thereof with two corresponding through holes (92) for two bolts (93) to screw thereinto. When the two wings (53), (54) of two adhering sucker mechanisms (100') of the present invention are separately connected to the lower rails (91) of the long metal member (90) and moved to predetermined positions, an adjustable sucker set (300) is formed. After two adjustable sucker sets (300) have been attached by vacuum suction to two sides of a car roof, the automatic sunshade winding mechanism (200) may be connected to the two adjustable sucker sets (300). To do this, first screw two bolts (93) through holes provided on a connecting board (80) that is then extended into the rail (202) provided along the bottom of the automatic sunshade winding mechanism (200). Allow the bolts (93) to downward project from the bottom rail (202) and extend into the two through holes (92) on the long metal member (90). Finally, use nuts (94) to lock the bolts (93), the connecting board (80), and one end of the automatic sunshade winding mechanism (200) to the long metal member (90) connected to one adjustable sucker set (300). Repeat the same procedures to lock the other end of the automatic sunshade winding mechanism (200) to the other adjustable sucker set (300) and complete the connection of the automatic sunshade winding mechanism (200) to the adjustable sucker sets (300) on the car roof to provide a shady place for use outdoors.

The long metal member (90) each may be formed at a top with two corresponding upper rails (95). A multipurpose rack (not shown) for holding bikes, trunks or skis may be directly connected to the adjustable sucker sets (300) on the car roof by engaging the multi-purpose rack with the upper rails (95) on the top of the long metal members (90), so that bikes, trunks or skis could be conveniently loaded on the car roof for use outdoors.

With the above arrangements, the roller sunshade for mounting on a car roof according to the present invention has simple structure and can be easily mounted on or dismounted from any place on the car roof. And, the sunshade cloth thereof can be freely pulled or rewound and locked to any desired extended position. The present invention is therefore an improved product over the conventional sunshades for cars and is practical for use.

What is claimed is:

1. A roller sunshade for mounting on a car roof, comprising an automatic sunshade winding mechanism and a plurality of adjustable sucker sets (300); each set of said adjustable sucker sets further comprising two adhering sucker mechanisms (100') and a long metal member;

said adhering sucker mechanism each comprising from bottom to top:
  a sucker main body (10') having a seat (20') integrally molded at a top center thereof, said seat having a concave top surface to provide a shallow round recess, and a sleeve integrally and fixedly connected to and upward projected from a central portion of said round recess of said seat;
  a 360-degree rotatable supporting board (50') having a round and concave central area downward protruded from said supporting board, such that said supporting board has a bottom contour matching with a contour of said shallow round recess on the top of the seat, allowing said supporting board to locate on said seat and freely and slidably rotate by up to 360 degrees on and relative to said shallow round recess;
  a locating block (60') having a round conical bottom corresponding to said round concave central area of said supporting board (50') to allow said locating block to fittingly contact in said round concave central area;
  a buffer washer being disposed on said locating block;
  a ring member being disposed on said buffer washer and having a bottom surface abutted on a top of said sleeve projected from said shallow round recess of said seat; and
  a bolt (70') being downward screwed into said sleeve to engage with an internal thread provided in said sleeve; and said long metal member being integrally formed at bottom and top surfaces with two lower and two upper rails, respectively; and said two lower rails being used to engage with two wings that extend from two sides of said supporting board;

whereby when two said adhering sucker mechanisms (100') are assembled to one said long metal member to complete on said adjustable sucker set and at least two said adjustable sucker sets are capable to be attached by vacuum suction to two sides of the car roof, said automatic sunshade winding mechanism may be mounted onto said at least two adjustable sucker sets to provide a shady place for use outdoors.

2. A roller sunshade for mounting on a car roof as claimed in claim 1, wherein said sleeve upward projected from said seat sequentially extends through a long slot provided in said concave central area of said supporting board, a vertical central hole of said locating block, and said buffer washer to press against the bottom surface of said ring member.

3. A roller sunshade for mounting on a car roof as claimed in claim 1, wherein said supporting board (50') has a long slot provided in said concave central area thereof, and said long slot is properly sized for said sleeve to extend therethrough.

4. A roller sunshade for mounting on a car roof as claimed in claim 1, wherein said supporting board (50') has left and right wings outward extended from two sides thereof, and said right wing being provided at a center with a square hole through which a bolt is downward screwed to connect a lower clamping plate to said right wing.

5. A roller sunshade for mounting on a car roof as claimed in claim 4, wherein said right wing of said supporting board is properly sized for extending into said lower rails formed at said bottom surface of said long metal member, and said lower clamping plate working with said bolt and a nut to lock said right wing to the bottom surface of said long metal member.

6. A roller sunshade for mounting on a car roof as claimed in claim 1, wherein said locating block (60') has a vertical central hole for said sleeve (40') on the top of said seat to extend therethrough.

7. A roller sunshade for mounting on a car roof as claimed in claim 1, wherein said sleeve (40') on the top of said seat has an overall length projected from said shallow round recess larger than a total thickness of said supporting board (50'), said locating block (60'), and said buffer washer, so that a clearance (C') always exists between said concave central area of said supporting board and said shallow round recess of said seat to allow said concave central area of said supporting board to freely and slidably rotate in and relative to said shallow round recess by up to 360 degrees.

8. A roller sunshade for mounting on a car roof as claimed in claim 1, wherein said long metal member is provided at a central portion near two outer sides thereof with two corresponding through holes for bolts to thread therethrough.

9. A roller sunshade for mounting on a car roof as claimed in claim 1, wherein said two upper rails formed on the upper surface of said long metal member are designed for selectively engaging with a rack for holding bikes, trunks or skis.

* * * * *